Oct. 1, 1935. C. H. KINGHAM 2,015,941
FIFTH WHEEL
Filed Oct. 24, 1933 2 Sheets-Sheet 1
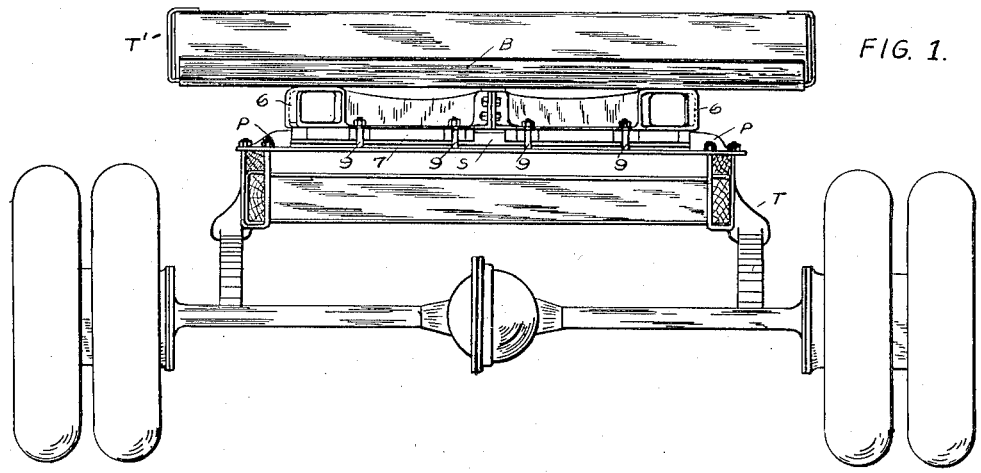
FIG. 1.
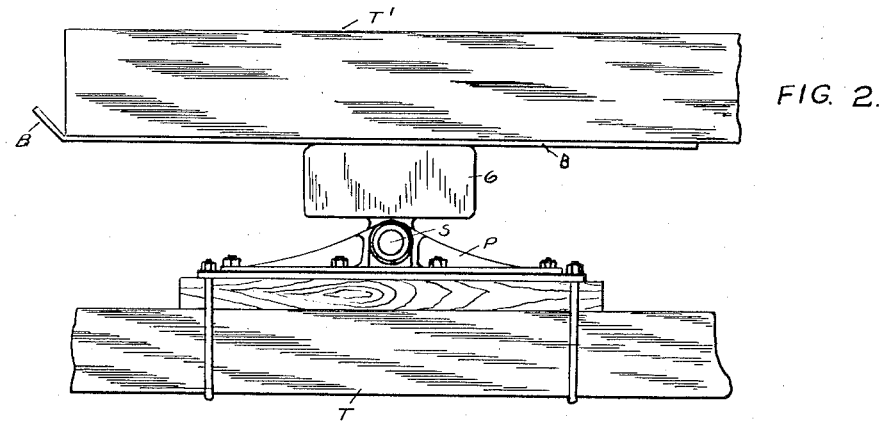
FIG. 2.
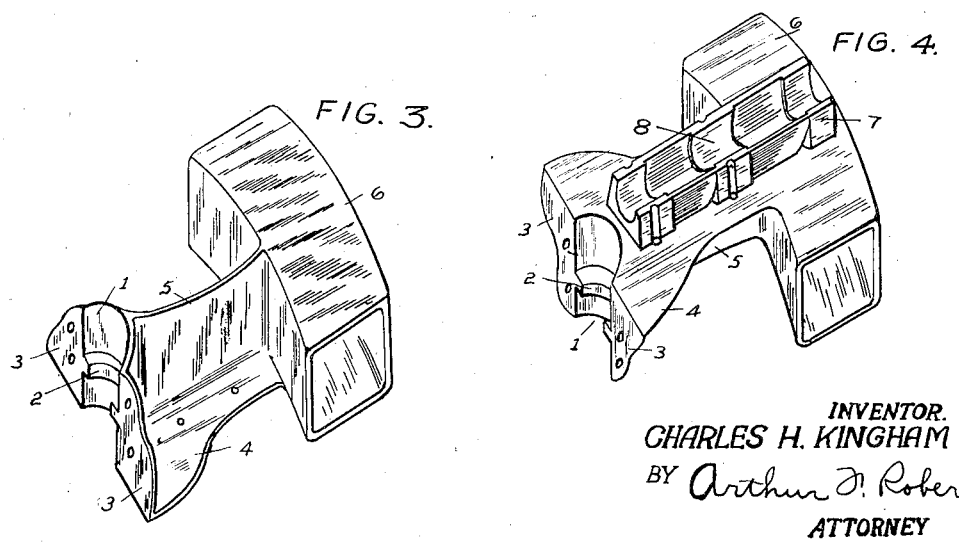
INVENTOR.
CHARLES H. KINGHAM
BY Arthur F. Robert
ATTORNEY Oct. 1, 1935.  C. H. KINGHAM  2,015,941
FIFTH WHEEL
Filed Oct. 24, 1933   2 Sheets-Sheet 2
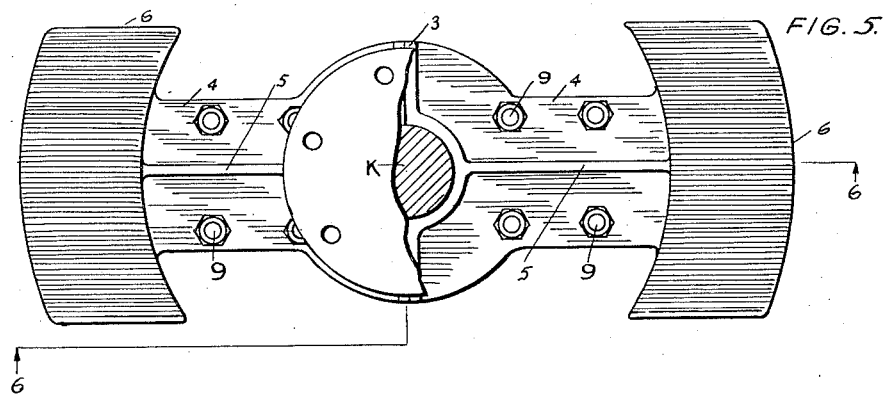
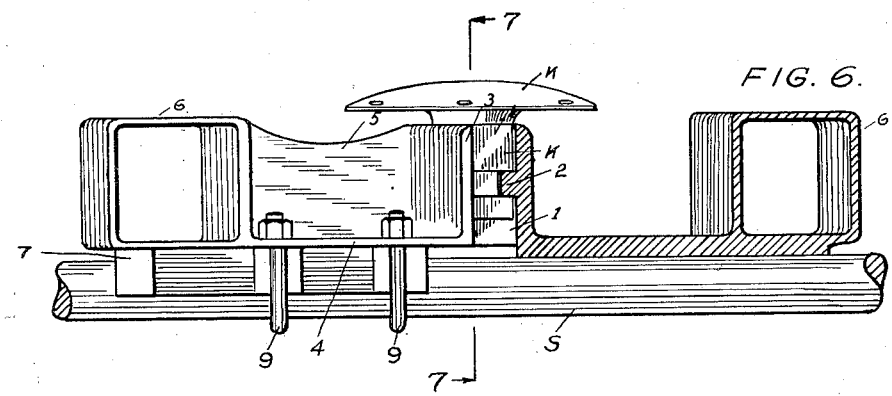
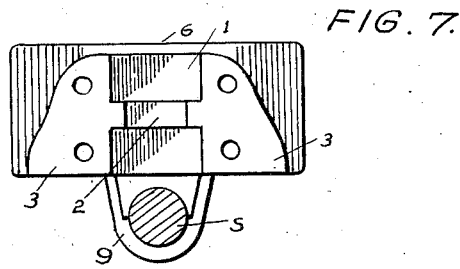
INVENTOR.
CHARLES H. KINGHAM
BY Arthur J. Robert
ATTORNEY.

Patented Oct. 1, 1935

2,015,941

UNITED STATES PATENT OFFICE 2,015,941

FIFTH WHEEL

Charles H. Kingham, Louisville, Ky.

Application October 24, 1933, Serial No. 695,022

5 Claims. (Cl. 308—136)

This invention relates to improvements in fifth wheel structures of the character commonly used to connect a trailer to a tractor. These constructions are commonly manufactured in two types— detachable and non-detachable. The detachable type is used where it is desirable or necessary to disconnect the trailer and tractor from time to time. Where a more or less permanent connection is desired, the non-detachable type is preferred because it can be made of lighter weight and with a smaller number of parts and, hence, is less expensive.

In the detachable type of structure, the fifth wheel is mounted on a supporting shaft which is anchored on the tractor and adapted for detachable connection to a king pin which is anchored on the trailer. This arrangement has been standardized to such degree that practically all makes of fifth wheels can be interchangeably used with all supporting shafts and king pins.

In the non-detachable type, no such standardization has been achieved. The various manufacturers have standardized on different forms and arrangements of parts, with the result that practically none of them is interchangeable to any useful degree. Furthermore, practically all of them while lighter in weight than the detachable type, nevertheless are made extremely heavy to the end, apparently, of withstanding the rough usage to which they are subjected.

The present invention is directed to the non-detachable type of structure and has for its principal object to produce a fifth wheel composed of parts which can be standardized to a degree comparable to that achieved in the detachable type.

Another object is to simplify the construction to the end of substantially reducing its weight, and thereby correspondingly reduce its cost without sacrificing the sturdiness required in structures of this type.

Another object is to provide a construction which can be easily and quickly secured in place.

Generally stated, the invention resides in a fifth wheel composed of a pair of castings which can be bolted together around the king pin of the trailer and secured to the fifth wheel supporting shaft of the tractor. With an arrangement of this character, the castings can be designed not only to fit the standard form of king pin, but the standard form of supporting shaft as well, thus adapting the resulting non-detachable wheel for use interchangeably with all detachable types of wheels now in common use. Furthermore, this arrangement replaces special parts heretofore utilized with a pair of simply formed, integral parts which obviously can be made comparatively light and yet extremely sturdy.

The invention is illustrated in the accompanying drawings, wherein:

Figures 1 and 2 are front and side elevations respectively of an embodiment of my invention as it appears in use;

Figures 3 and 4 are top and bottom perspective views respectively of one-half of the fifth wheel, the other half being of identical form and arrangement;

Figure 5 is a top plan view of the wheel showing the king pin in section;

Figure 6 is a section along line 6—6 of Figure 5, and showing the relation of the fifth wheel to the supporting shaft; and Figure 7 is a view taken along line 7—7 of Figure 6.

The invention is illustrated in Figures 1 and 2 in connection with the adjacent or connecting ends of a conventional tractor T and trailer T'. The tractor is provided with a supporting shaft S which is secured at its ends through plates P to the chassis of the tractor. The trailer is provided with a king pin K (see Figure 5) which is anchored to the trailer and which projects through the bolster plate B thereof. The parts mentioned, particularly the shaft S and pin K, are made of the standard form and arrangement heretofore generally utilized in connection with the detachable type of fifth wheel. In accordance with my invention, my improved non-detachable fifth wheel is substituted in place of the detachable type of fifth wheel.

The fifth wheel is composed of two castings preferably of identical form, which are arranged to be bolted together around the king pin K with clearance sufficient to permit the necessary relative turning movement therebetween. Accordingly, an end face of each casting is provided with a vertically arranged recess 1 which, when the castings are placed with their corresponding end faces in opposed relation, cooperate with each other to define a vertical opening or socket in which the pin K may be held. These inner end faces are designed to cooperate with the king pin K to provide a tongue and groove connection for the purpose of holding the pin in the socket. Inasmuch as the castings are preferably intended for use in connection with a king pin of standard form, the recessed portions 1 of the end faces are preferably made of the cylindrical form shown, and provided with a horizontally projecting tongue 2 respectively to accommodate the cylindrical form and horizontal groove of the standard king pin. The castings are provided with flanges 3 which form a part of the inner end faces of the castings. These flanges are provided with suitable bolt holes to receive the bolts by which the castings are secured together.

The body of each casting which extends horizontally from and at right angles to the vertical plane of its inner end face, may be fashioned in any suitable shape. In the structure illustrated, the body is made of inverted T-shaped cross-section having a horizontal bottom web 4 and a vertical central web 5. These webs, together with the securing flanges 3 render the castings extremely sturdy and permit them to be made of comparatively light weight. Each casting terminates at its outer end in a transversely arranged, hollow or box-like member 6, the upper surface of which is adapted to bear against and support the weight of the trailer when a pin is contained in the socket of the wheel. Inasmuch as the tractor, in turning, will move in a horizontal plane angularly about the pin K and thus cause the fifth wheel to turn relatively to the trailer, the member 6 is made of arcuate form, the arc of which more or less conforms to the path of relative movement. Furthermore, this member is made hollow, to reduce the weight of the castings, and yet retain a high degree of strength.

While the castings may be secured to a tractor in any suitable manner, they are, as stated, preferably intended for securement to the standard form of supporting shaft S shown in the drawings. Accordingly, the under side or bottom face of each casting is provided with an integral depending portion or flange 7 having a groove 8 of a size sufficient to fit over and seat upon the upper half of the supporting shaft S. The fifth wheel is secured to the shaft S after it has been secured to the pin of the trailer. The securement is effected simply by lowering the trailer with fifth wheel attached to bring the co-extensive bottom grooves 8 of the wheel over the shaft, and then passing U-bolts 9 around the lower half of the shaft and upwardly on both sides thereof through suitable holes in the horizontal webs 4, the bolts being held in any suitable manner as by the nuts shown.

Having described my invention, I claim:

1. A fifth wheel of the non-detachable type comprising a pair of castings each having a vertically-recessed flanged face at one end and at its opposite end a transversely arranged member adapted to support the weight of a trailer, the end face of each casting being connected to the supporting member thereof by horizontal and vertical webs, and the flanges of one casting being adapted for securement to the flanges of the other casting to hold said end faces in opposed relation wherein their vertical recesses mutually cooperate to provide a socket for receiving the king pin of a trailer.

2. A fifth wheel of the non-detachable type comprising a pair of castings each having a vertically-recessed flanged face at one end and at its opposite end a transversely arranged member adapted to support the weight of a trailer, the end face of each casting being connected to the supporting member thereof by horizontal and vertical webs, and the flanges of one casting being adapted for securement to the flanges of the other casting to hold said end faces in opposed relation wherein their vertical recesses mutually cooperate to provide a socket for receiving the king pin of a trailer, said end faces being further adapted to cooperate with the king pin contained in the socket to provide a tongue and groove connection therebetween for holding the pin in said socket.

3. A fifth wheel of the non-detachable type comprising a pair of castings each having at one end a vertically-recessed end face, said castings being adapted for securement in opposed relation wherein their vertically recessed end faces mutually cooperate to provide a socket for the king pin of a trailer, said castings each having at their opposite end a transversely arranged hollow member which presents an upwardly facing surface to engage the trailer and support the weight thereof when its king pin is contained in the socket.

4. A fifth wheel of the non-detachable type comprising a pair of castings each having at one end a vertically-recessed laterally-flanged end face, the flanges of one casting being adapted for securement to the flanges of the other casting to hold the end faces in opposed relation wherein their recesses mutually cooperate to provide a socket for the king pin of a trailer, said castings each having at their opposite end a transversely arranged hollow member presenting an upwardly facing surface which is positioned to engage a downwardly facing surface on a trailer to support the weight of the trailer when its king pin is contained in the socket.

5. A fifth wheel of the non-detachable type comprising a pair of castings each having vertically recessed end faces and horizontally grooved bottom faces, said castings being adapted both for securement to each other with their recessed end faces held in opposed relation wherein they cooperate to provide a socket for receiving the king pin of a trailer and for securement to the shaft of a tractor with their grooved bottom faces held in co-extensive relation against the upper face of said shaft, said recessed end faces being adapted for cooperation with a pin contained in the socket to provide a horizontal tongue and groove connection therebetween, and said castings each having at their outer ends a transversely arranged hollow member presenting an upwardly facing surface which is positioned to engage a downwardly facing surface of a trailer whose pin is contained in said socket.

CHARLES H. KINGHAM.